United States Patent
Biswas et al.

(10) Patent No.: US 9,374,506 B2
(45) Date of Patent: Jun. 21, 2016

(54) METHOD AND APPARATUS OF REDUCING RANDOM NOISE IN DIGITAL VIDEO STREAMS

(71) Applicant: Qualcomm Incorporated, San Diego, CA (US)

(72) Inventors: Mainak Biswas, Karnataka (IN); Vasudev Bhaskaran, San Diego, CA (US); Sujith Srinivasan, Karnataka (IN); Shilpi Sahu, Karnataka (IN)

(73) Assignee: QUALCOMM INCORPORATED, San Diego, CA (US)

( * ) Notice: Subject to any disclaimer, the term of this patent is extended or adjusted under 35 U.S.C. 154(b) by 551 days.

(21) Appl. No.: 13/734,595

(22) Filed: Jan. 4, 2013

(65) Prior Publication Data

US 2014/0192267 A1 Jul. 10, 2014

(51) Int. Cl.
*H04N 5/14* (2006.01)
*G06T 5/00* (2006.01)
*G06T 5/20* (2006.01)
*G06T 5/50* (2006.01)
*G06T 7/20* (2006.01)

(52) U.S. Cl.
CPC ............... *H04N 5/144* (2013.01); *G06T 5/002* (2013.01); *G06T 5/20* (2013.01); *G06T 5/50* (2013.01); *G06T 7/2053* (2013.01); *G06T 2207/10016* (2013.01); *G06T 2207/10024* (2013.01); *G06T 2207/20012* (2013.01); *G06T 2207/20182* (2013.01); *G06T 2207/20192* (2013.01); *G06T 2207/20221* (2013.01); *G06T 2207/20224* (2013.01)

(58) Field of Classification Search
CPC ..................................................... G06T 5/002
See application file for complete search history.

(56) References Cited

U.S. PATENT DOCUMENTS

| | | | |
|---|---|---|---|
| 8,149,336 B2 | 4/2012 | Mohanty et al. | |
| 8,279,345 B2 | 10/2012 | Rossignol et al. | |
| 2003/0097069 A1* | 5/2003 | Avinash | G06T 5/002 600/447 |
| 2005/0280739 A1 | 12/2005 | Lin et al. | |
| 2006/0093236 A1* | 5/2006 | Drezner | G06T 5/002 382/272 |

(Continued)

OTHER PUBLICATIONS

Corner, B.R., et al., "Noise Reduction in Remote Sensing Imagery Using Data Masking and Principal Component Analysis", Proceedings of SPIE, SPIE—International Society for Optical Engineering, US, vol. 4115, Jul. 31, 2000, pp. 1-11, XP008007663, ISSN: 0277-786X, DOI: 10.1117/12.411533 Section 1.2.

(Continued)

*Primary Examiner* — Dave Czekaj
*Assistant Examiner* — Berteau Joisil
(74) *Attorney, Agent, or Firm* — Knobbe Martens Olson & Bear LLP

(57) ABSTRACT

Method and apparatus for reducing random noise in digital video streams are described. In one innovative aspect, the device includes a noise estimator. The device also includes a motion detector configured to determine a motion value indicative of motion between two frames of the video stream, the motion value based at least in part on the noise value. The device further includes a spatial noise reducer configured to filter the image data based at least in part on a blending factor and the noise value. The device also includes a temporal noise reducer configured to filter the video data based on the motion value and the noise value. The device also includes a blender configured to blend the spatial and temporal filtered values to provide a weighted composite filtered output image.

21 Claims, 10 Drawing Sheets

(56) References Cited

U.S. PATENT DOCUMENTS

| | | | |
|---|---|---|---|
| 2007/0040919 A1* | 2/2007 | Tsuruoka | H04N 1/409 348/241 |
| 2007/0229709 A1* | 10/2007 | Asamura | H04N 5/21 348/607 |
| 2007/0236609 A1 | 10/2007 | Pathak et al. | |
| 2009/0167951 A1 | 7/2009 | Chiu | |
| 2012/0019667 A1 | 1/2012 | Moesle et al. | |
| 2012/0019727 A1 | 1/2012 | Zhai et al. | |

OTHER PUBLICATIONS

International Search Report and Written Opinion—PCT/US2013/073659—ISA/EPO—Apr. 11, 2014.

Lee, J-S., "Digital Image Smoothing and the Sigma Filter", Computer Vision, Graphics, and Image Processing, Elsevier Science, vol. 24, Jan. 1, 1983, pp. 255-269, XP002511283, ISSN: 0734-189X, DOI:10.1016/0734-189X(83)90047-6 Retrieved from the Internet: URL:http://www.sciencedirect.com/science?_ob=ArticleListURL &_method=list&_ArticleListiD=8 55305751&_sort=d&view=c &_acct=C000049880&_version=1&_urlVersion=0&_ userid=987766&md5=950d6052c81072aea0b8c419fac73a35> [retrieved on Jan. 20, 2009] the whole document.

Tai S C., et al., "A Fast Method for Image Noise Estimation Using Laplacian Operatror and Adaptive Edge Detection", 3rd International Symposium on Communications, Control, and Signal Processing (ISCCSP 2008), IEEE, USA, Mar. 12, 2008, pp. 1077-1081.

* cited by examiner

METHOD AND APPARATUS OF REDUCING RANDOM NOISE IN DIGITAL VIDEO STREAMS

BACKGROUND

1. Field

The present invention relates to reduction of noise in digital video streams, more specifically to reducing random noise in digital video streams.

2. Background

Digital video content that is generated, transmitted, and viewed may be affected by noise. Two types of noise are random noise and compression noise. Random noise (which may also be referred to as video noise or Gaussian noise) may be produced by the sensor (e.g., camera) or by transmission of the video over analog channels. Compression noise may arise when digital video is compressed as part of storage or transmission.

Both random and compression noise may be distracting to the viewer and affect the experience of watching video content—especially on larger displays. Creating a viable, noise-free video eco-system, directly from the sensor to the display, is difficult and in some implementations not possible. Furthermore, the scale and speed at which the images are needed to provide video quality presentation involves processing many pixels in a short period of time. For example, modern televisions may feature 1920×1080 pixels (e.g., over 2 million pixels). As cameras and display technologies gain sophistication and consumers demand higher fidelity, the number of pixels may also increase.

Therefore, there is a need to provide methods and apparatus for reducing random noise that may be included in digital video streams.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include spatial noise reduction based on features of the video data. Another non-limiting advantage is the method of estimating noise in the video data which, in part, is based on features of the video data and does not depend on fixed thresholds. A further non-limiting advantage of the disclosed systems and methods includes noise reduction using circuits having calibrated levels of precision to enhance the temporal noise reduction. Yet another non-limiting advantage of the disclosure relates to the motion detection which may be configured to combine a sum of the absolute differences and a maximum difference to provide an accurate motion detection. A further non-limiting advantage is the use of a blending circuit to combine the spatial and temporal noise reduced images based at least in part on the motion estimation.

In one innovative aspect, a device for reducing noise of a video stream is provided. The device includes a noise estimator configured to determine a noise value indicative of noise for a frame of the video stream. The device also includes a motion detector configured to determine a motion value indicative of motion between two frames of the video stream, the motion value based at least in part on the noise value. The device further includes a spatial noise reducer configured to identify at least one pixel value in the frame as an edge and modify the pixel value based at least in part on a blending factor and the noise value. The device also includes a temporal noise reducer configured to modify at least one pixel value in the frame based at least in part on a value for a pixel in a prior frame and the noise value. The device also includes a blender configured to generate a composite pixel value based at least in part on the spatially modified pixel value, the temporally modified pixel value, and the motion value.

In a further innovative aspect, a method for reducing noise of a video stream is provided. The method includes determining a noise value indicative of noise for a frame of the video stream. The method includes determining a motion value indicative of motion between two frames of the video stream, the motion value based at least in part on the noise value. The method also includes identifying at least one pixel value in the frame as an edge and modifying the pixel value based at least in part on a blending factor and the noise value. The method further includes modifying at least one pixel value in the frame based at least in part on a value for a pixel in a prior frame and the noise value. The method also includes generating a composite pixel value based at least in part on the spatially modified pixel value, the temporally modified pixel value, and the motion value.

Another device for reducing noise of a video stream is also provided. The device includes means for determining a noise value indicative of noise for a frame of the video stream. The device includes means for determining a motion value indicative of motion between two frames of the video stream, the motion value based at least in part on the noise value. The device further includes means for identifying at least one pixel value in the frame as an edge and for modifying the identified pixel value based at least in part on a blending factor and the noise value. The device also includes means for modifying at least one pixel value in the frame based at least in part on a value for a pixel in a prior frame and the noise value. The device further includes means for generating a composite pixel value based at least in part on the spatially modified pixel value, the temporally modified pixel value, and the motion value.

A computer-readable storage medium comprising instructions executable by a processor of an apparatus for reducing noise in a video stream is provided in yet another innovative aspect. The instructions cause the apparatus to determine a noise value indicative of noise for a frame of the video stream. The instructions further cause the apparatus to determine a motion value indicative of motion between two frames of the video stream, the motion value based at least in part on the noise value. The instructions cause the apparatus to identify at least one pixel value in the frame as an edge and modify the identified pixel value based at least in part on a blending factor and the noise value. The instructions cause the apparatus to modify at least one pixel value in the frame based at least in part on a value for a pixel in a prior frame and the noise value. The instructions also cause the apparatus to generate a composite pixel value based at least in part on the spatially modified pixel value, the temporally modified pixel value, and the motion value.

Another device for reducing noise of a video stream is also provided. The device includes a processor. The processor is configured to determine a noise value indicative of noise for a frame of the video stream. The processor is configured to determine a motion value indicative of motion between two frames of the video stream, the motion value based at least in part on the noise value. The processor is configured to identify at least one pixel value in the frame as an edge and modify the identified pixel value based at least in part on a blending factor and the noise value. The processor is configured to modify at least one pixel value in the frame based at least in part on a value for a pixel in a prior frame and the noise value. The processor is configured to generate a composite pixel value based at least in part on the spatially modified pixel value, the temporally modified pixel value, and the motion value.

These and other implementations consistent with the invention are further described below with reference to the following figures.

In the figures, to the extent possible, elements having the same or similar functions have the same designations.

DETAILED DESCRIPTION

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Figure 1:
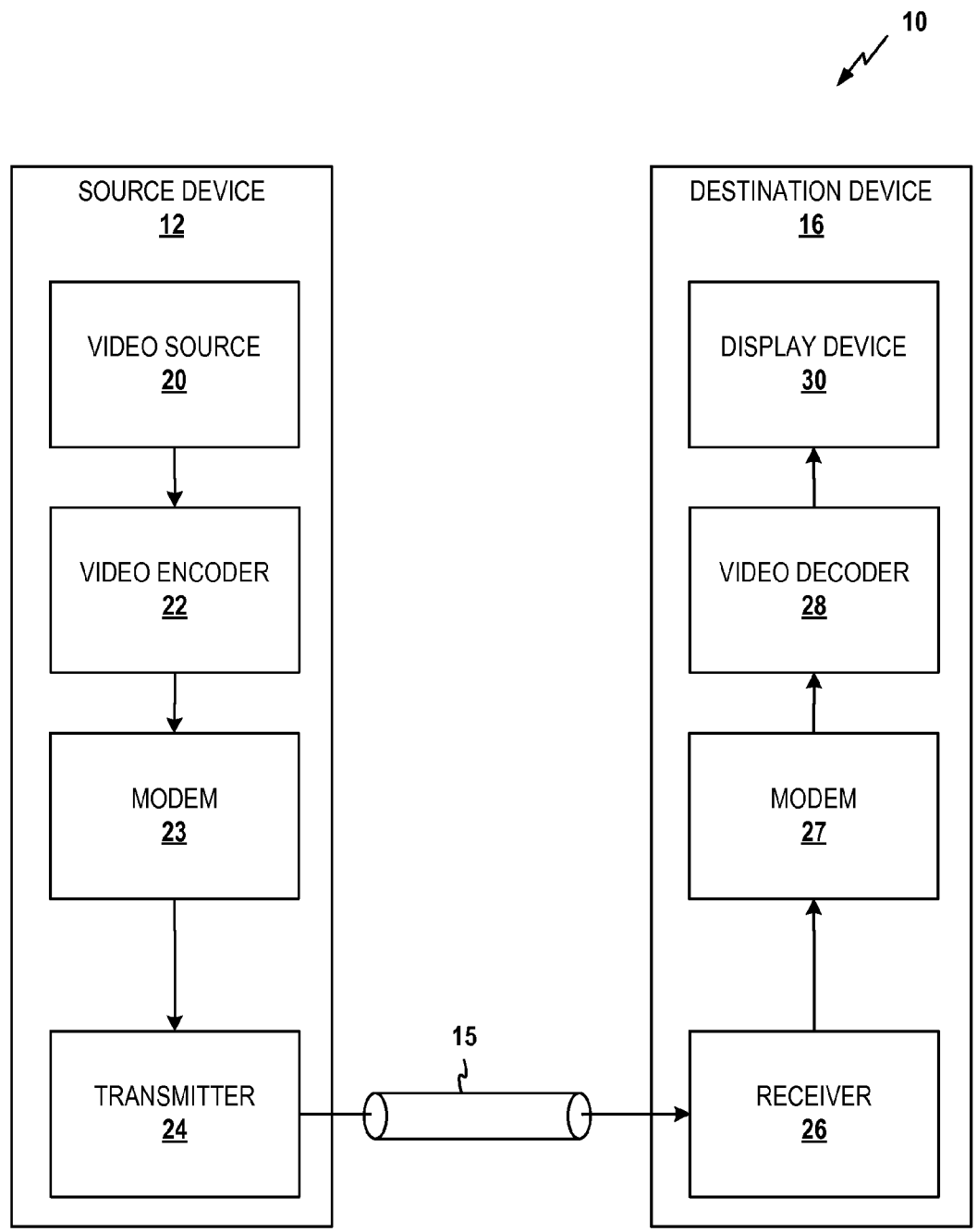
FIG. 1 illustrates a functional block diagram of an exemplary video encoding and decoding system.

FIG. 1 illustrates a functional block diagram of an exemplary video encoding and decoding system. As shown in FIG. 1, system 10 includes a source device 12 that may be configured to transmit encoded video to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. However, the processes of this disclosure, which generally concern the detection and correction of random noise in digital video streams, may be used in many different systems and settings. FIG. 1 is merely one example of such a system.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to encode a sequence of frames of a reference image. The video encoder 22 may be configured to encode additional information associated with the images such as 3D conversion information including a set of parameters that can be applied to each of the video frames of the reference sequence to generate 3D video data. Modem 23 and transmitter 24 may modulate and transmit wireless signals to destination device 16. In this way, source device 12 communicates the encoded reference sequence along with any additional associated information to destination device 16.

Receiver 26 and modem 27 receive and demodulate wireless signals received from source device 12. Accordingly, video decoder 28 may receive the sequence of frames of the reference image. The video decoder 28 may also receive the additional information which can be used for decoding the reference sequence.

Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. As part of the encoding process, the video encoder 22 may be configured to implement one or more of the methods described herein, such as random noise detection and/or correction for digital video streams. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 may be configured to receive information over channel 15. Modem 27 may be configured to demodulate the information. Again, the video encoding process may implement one or more of the techniques described herein such as random noise detection and/or correction for digital video streams. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Video encoder 22 and video decoder 28 may operate consistent with a video compression standard, such as the ITU-T H.264 standard, alternatively described as MPEG-4, Part 10, and Advanced Video Coding (AVC). The techniques of this disclosure, however, are not limited to any particular coding standard or extensions thereof. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a multiplexer protocol (e.g., ITU H.223) or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 and video decoder 28 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units. In this disclosure, the term "coded unit" refers to any independently decodable unit of a video frame such as an entire frame, a slice of a frame, a group of pictures (GOPs), or another independently decodable unit defined according to the coding techniques used.

Video encoder 22 and/or video decoder 28 of system 10 of FIG. 1 may be configured to employ techniques for random noise reduction as described in this disclosure. In particular, video encoder 22 and/or video decoder 28 may include a noise reducer that applies at least some of such techniques to reduce random noise which may be included in the video.

Figure 2:
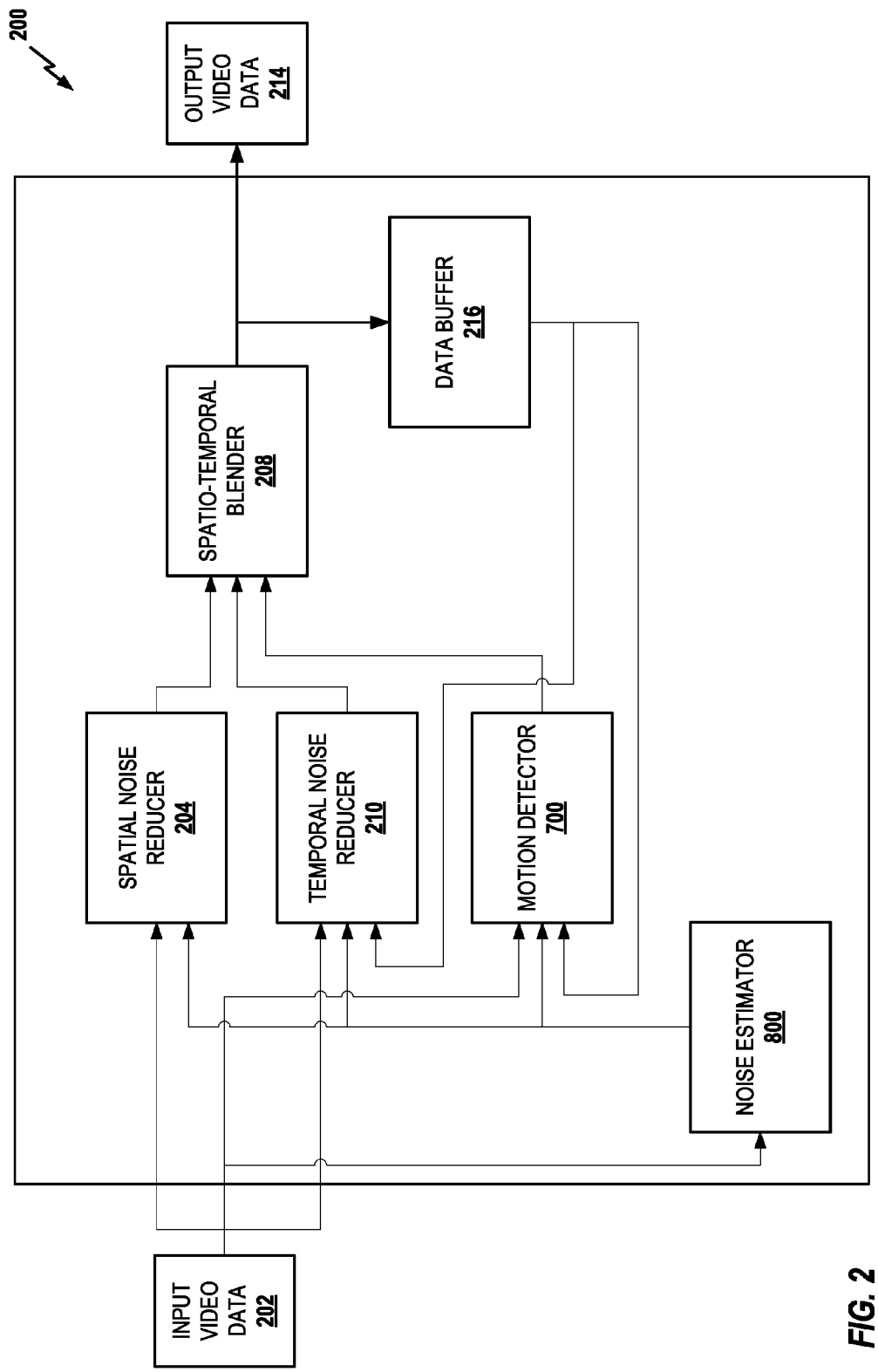
FIG. 2 illustrates a functional block diagram of an exemplary random noise reducer.

FIG. 2 is a block diagram illustrating an example of a functional block diagram of a random noise reducer. The random noise reducer 200 may be included in the source device 12. For example, in some implementations, it may be desirable to reduce random noise introduced by the video source 20 (e.g., camera). In such implementations, the random noise reducer 200 may obtain the output of the video source 20 and provide a noise reduced video stream to the video encoder 22. In some implementations, the random noise reducer 200 may be included in the video source 22 or video encoder.

In some implementations, the random noise reducer 200 may be included in the destination device 16. For example, in some implementations, it may be desirable to reduce random noise introduced by the source device 12 or transmission. In such implementations, the random noise reducer 200 may be included in the video decoder 28. In some implementations, the random noise reducer 200 may be included as a post-decoding module. In such implementations, the random noise reducer 200 may be configured to receive the decoded video from the video decoder 28 and reduce random noise included in the decoded video prior to display.

The random noise reducer 200 receives input video data 202. The input video data 202 may be a frame of video data. For ease of discussion, the input video data 202 will include a frame of video data. However, it will be understood that the systems and methods described may be adapted for input video data 202 such as macroframes, superframes, groups of pictures, or other portions of the video data. As discussed above, the input video data 202 may be an image included in a stream of video data. The input may be the actual video data or a value indicating the location of the video data. If input video data 202 is location information, the random noise reducer 200 may include a circuit configured to retrieve the pixel information for the identified input video data 202.

The input video data 202 may include luminance data for the pixels included therein. The input video data 202 may include chrominance data for the pixels included therein. In some implementations, the input video data 202 may be represented using 8 bits. In some implementations, the input video data 202 may be represented using 10 bits. The random noise reducer 200 may be configured to increase the number of bits used for the various operations to achieve enhanced noise reduction by, for example, increasing the precision during the filtering as will be described below.

The input video data 202 may be provided to a spatial noise reducer 204. As shown, the spatial noise reducer 204 also receives a noise estimation value from a noise estimator 800. Based at least in part on these inputs, the spatial noise reducer 204 may be configured to filter the input video data 202 to generate a reduced noise version of the input video data 202.

In some implementations, the spatial noise reducer 204 may be configured to perform edge adaptive spatial noise reduction filtering based on a filter kernel having a fixed size. A filter kernel generally refers to group of pixels that will be considered for a given filtering operation for a pixel of interest. In some implementations, a filter kernel may be referred to as a filter window.

Figure 3:
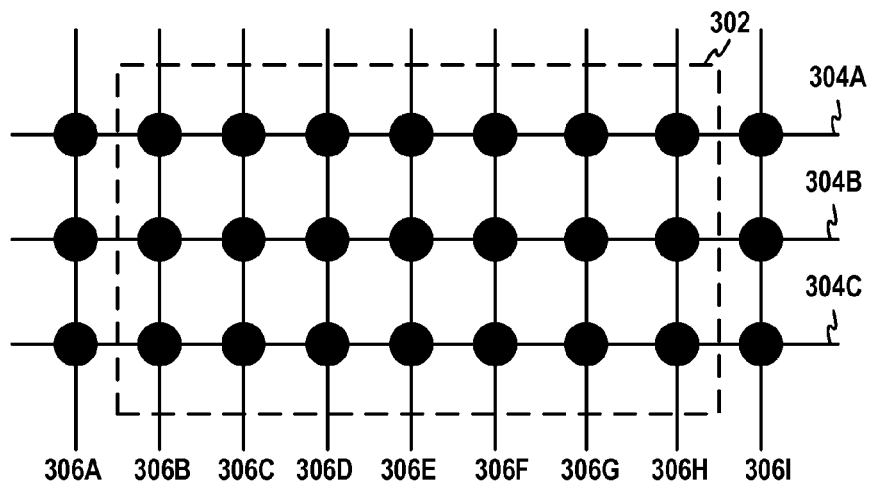
FIG. 3 illustrates a pixel diagram of an exemplary filter kernel.

FIG. 3 illustrates a pixel diagram of an exemplary filter kernel. As shown, the filter kernel 302 includes seven columns (e.g., 306B-306H) of pixels over three rows (e.g., 304A-304C). Other filter kernel sizes (e.g., 3×7, 5×2, 11×4) may be used without departing from the scope of the present disclosure. The filter kernel size may be a pre-determined configuration selected based on the implementation of the random noise reducer 200. The filter kernel size may be dynamically determined based on, for example, the input video data 202, the video stream, the device in which the random noise reducer 200 is included, and the like. As shown in FIG. 3, the pixel of interest is the pixel located at row 304B and column 306E. It should be noted that the pixel kernel 302 does not include the pixels located in columns 306A or 306I. In the implementations shown, the pixels outside the filter kernel 302 may be considered too remote so as to factor into the filtering of the pixel of interest, that is the pixel located at row 304B and column 306E.

Returning to FIG. 2, the spatial noise reducer 204 may be implemented as a low pass filter to reduce the noise. The filtering may be considered "edge adaptive" because the filtering is based on a strength of differences between the pixel of interest and the pixels within the filter kernel. This strength difference, in some implementations, may be referred to as edge detection. Each input video data 202 may include different pixel values which will be adaptively filtered based on the included pixels rather than based on a fixed filter value. Accordingly, the spatial noise reducer 204 may dynamically adjust the filtering based at least in part on the input video data 202.

Equation (1) is an example of an edge adaptive filtering that may be implemented by the spatial noise reducer 204. Equation (1) may used to filter the pixel of interest p(x0,y0) to generate a new, filtered pixel value p'(x0,y0). The pixel value filtered may be luminance value and/or chrominance value for the pixel of interest.

$$p'(x0, y0) = \frac{\lambda p(x0, y0) + \sum_{k=x0-m}^{x0+m} \sum_{l=y0-n}^{y0+n} p(k, l) \times \delta(k, l)}{\lambda + \gamma} \quad (1)$$

where $$\gamma = \sum_{k=x0-m}^{x0+m} \sum_{l=y0-n}^{y0+n} \delta(k, l)$$

$$\delta(k, l) = \begin{cases} 1 & \text{if } |p(x0, y0) - p(k, l)| < \varepsilon \\ 0 & \text{otherwise} \end{cases}$$

$$k \in [x0 - m, x0 + m]$$

$$l \in [y0 - n, y0 + m]$$

and where
m is the width of the pixel kernel,
n is the height of the pixel kernel,
λ is a blending factor and
ε is a filter threshold.

As discussed above, the height and width of the pixel kernel may be pre-determined or adaptively determined. The blending factor is a value that determines a magnitude for the potential filtered pixel value. The blending factor may be pre-determined (e.g., stored in memory) or adaptively determined based on one or more of the video, the type of video (e.g., sports, movie), the target display, or the like. In some implementations, the blending factor may be a value between 8 and 16. In some implementations, the blending factor may be 3, 26, or 40. The filter threshold is a value indicating the magnitude of difference between the pixel of interest and a pixel in the pixel kernel which will cause the value of the pixel in the kernel to be included in the filtered pixel value. In some implementations, the filter threshold may be user specified. In some implementations, the filter threshold may be determined based on a specified gain and standard deviation of noise.

In some implementations, the spatial noise reducer 204 may be configured to perform feature adaptive spatial noise reduction. In such implementations, the spatial noise reducer 204 may adjust the filter kernel shape based on the pixels around the pixel of interest. This allows the spatial noise reducer 204 to filter pixels that lie spatially adjacent to an image feature in addition to considering the pixel values as described in the edge adaptive implementation above. This may be desirable for filtering input video data 202 which may include weak edges. In such implementations, filtering on luminance may filter the edge out of the final image.

Figure 4:
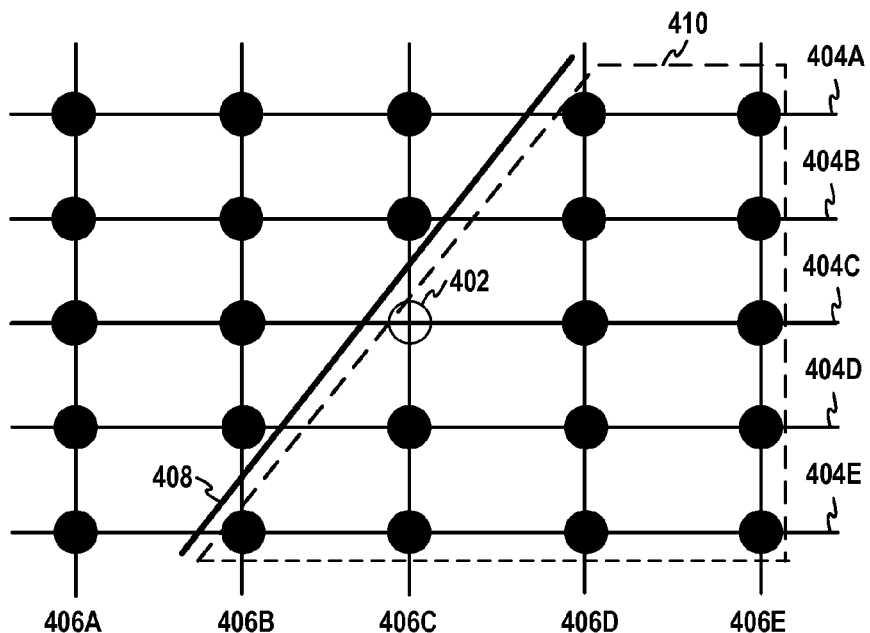
FIG. 4 illustrates a pixel diagram of another exemplary filter kernel.

FIG. 4 illustrates a pixel diagram of another exemplary filter kernel. The filter kernel 410 may be determined for a pixel of interest 402 based on a feature of the image. In FIG.

4, an image edge 408 is shown. For example, the image edge 408 may correspond to the edge a building against the sky. In other example, the pixels not included in the filter kernel 410 may have similar luminance values as those within the kernel.

One implementation of the feature adaptive spatial noise reducer 204 operates over each pixel in the input video data 202. The spatial noise reducer identifies an initial local window around the pixel of interest 402. The initial local window may be, for example, a 5×5 pixel window. The shape of the features inside the local window, such as the edge 408 or just image texture, may then be identified. One method of identifying the shapes is through a covariance matrix. For example, an estimate of a 2×2 covariance matrix may be identified. Equation (2) describes an example estimation of the covariance matrix C.

$$C = \begin{pmatrix} xdiff & xydiff \\ xydiff & ydiff \end{pmatrix} \quad (2)$$

where
xdiff is an average of all squared horizontal differences between adjacent pixels in the local window,
ydiff is an average of all squared vertical differences between adjacent pixels in the local window, and
xydiff is an average of all product differences (horizontal×vertical) between adjacent pixels in the window.

The spatial noise reducer 204 may use the covariance matrix to generate filter coefficients for spatial noise reduction filtering. Equation (3) shows an example filter coefficient calculation which may be implemented by the spatial noise reducer 204.

$$h_{ij} = e^{-\left(\frac{d'Cd}{\alpha}\right)} \quad (3)$$

where
$h_{ij}$ is the filter coefficient at each location,
C is the covariance matrix determined in Equation (2),
d is a distance vector given by Equation (4) below, and
α is a filter strength factor.

$$d = \begin{pmatrix} dx_{ij} \\ dy_{ij} \end{pmatrix} \quad (4)$$

where
$dx_{ij}$ is the horizontal distance of $h_{ij}$ from the center of the local window, and
$dy_{ij}$ is the vertical distance of $h_{ij}$ from the center of the local window.

The filter strength factor is a parameter that affects the strength of the filter. The filter strength factor may be predetermined (e.g., stored in memory) or adaptively determined based on one or more of the video, the type of video (e.g., sports, movie), the target display, the noise estimation, or the like.

The spatial noise reducer 204 may generate an 8-bit output which includes pixel values for a spatially noise reduced version of the input video data 202. As shown in FIG. 2, the result is provided to a spatio-temporal blender 208 which will be described in further detail below.

Two types of spatial noise reduction have been described, namely edge adaptive and feature adaptive spatial noise reduction. The spatial noise reducer 204 may be configured to receive a configuration value to identify which mode of noise reduction to implement. Edge adaptive may utilize fewer processing resources such as processing time, battery, and bandwidth than feature adaptive spatial noise reduction. Consider an implementation where the spatial noise reducer 204 is included in a mobile phone. The mobile phone may be configured to use edge adaptive spatial noise reduction when the battery level associated with the mobile phone is below a certain threshold to preserve the life of the battery. Once coupled with a power source, the mobile phone may be configured to adjust the spatial noise reducer to use feature adaptive spatial noise reduction in view of the revised power characteristics of the device.

Returning to FIG. 2, the input video data 202 may also be provided to a temporal noise reducer 210. The temporal noise reducer 210 may be configured to also obtain a noise estimation from a noise estimator 800. The temporal noise reducer 210 may also obtain video data associated with a previous portion of the video stream from a data buffer 216. For example, in an implementation where the input video data 202 is a frame of video data, the data buffer 216 may be a frame buffer. It should be noted that the previous portion received by the temporal noise reducer 210 is a portion that has already been filtered by the random noise reducer 200. As will be discussed in further detail below, the previously filtered portion may be represented using eleven bits, eight of which represent an integer value, three of which represent a fractional value. Similarly, the noise estimate may be represented using seven bits, five of which represent an integer value, two of which represent a fractional value. It should be further noted that the implementation shown in FIG. 2 includes one frame buffer. This frame buffer is used to access a previous portion of the video data. Such implementations offer reduced hardware requirements to perform the noise reduction by maintaining one previous portion. This reduction further provides power and processing savings to the electronic device as fewer resources need be expended to maintain and retrieve multiple previous portions. In some implementations, the frame buffer may be implemented using off-chip DRAM.

The temporal noise reducer 210 may be configured filter a given pixel value based on luminance and chrominance values of the pixel in a current portion (e.g., frame) and a previous portion (e.g., frame). Equation (5) is one expression of the relationship that may be implemented in a temporal noise reducer 210 to generate a temporally filtered pixel value $Y_t$.

$$Y_t(i,j,n) = X(i,j,n)(1-\beta) + Y(i,j,n-1)\beta \quad (5)$$

where
$Y_t(i, j, n)$ is the temporally filtered pixel value at a location (i, j) included in the current portion (n) of video data,
X(i, j, n) is the chrominance value of a pixel at a location (i, j) included in the current portion (n) of video data,
β is the noise estimate, and
$Y_t(i, j, n-1)$ is the luminance value of a pixel at the location (i, j) included in the previous portion (n−1) of the input video data.

The resulting temporally noise reduced pixel value may be provided to the spatio-temporal blender 208. The precision of the temporally noise reduced pixel value is dependent upon the inputs to the temporal noise reducer 210. Generally, the precision of output of the temporal noise reducer 210 may be of the same precision as the most precise input. For instance, in the above example, the previous portion of video data obtained from the data buffer 216 may be represented using eleven bits, three of which represent fractional component of the pixel value. Accordingly, the output of the temporal noise reducer 210 may be of the same precision as the most precise input. In the example above, the output may be represented using eight bits to identify the integer portion of the pixel value and three bits to identify the fractional portion. Using the higher precision for temporal filtering may reduce post-noise reduction errors such as quantization errors caused by infinite impulse response filtering. The higher precision may also reduce the presence of visual artifacts in the output video such as one artifact referred to as color cast. Color cast generally refers to a perceived pink or green tinge in the output video.

Figure 5:
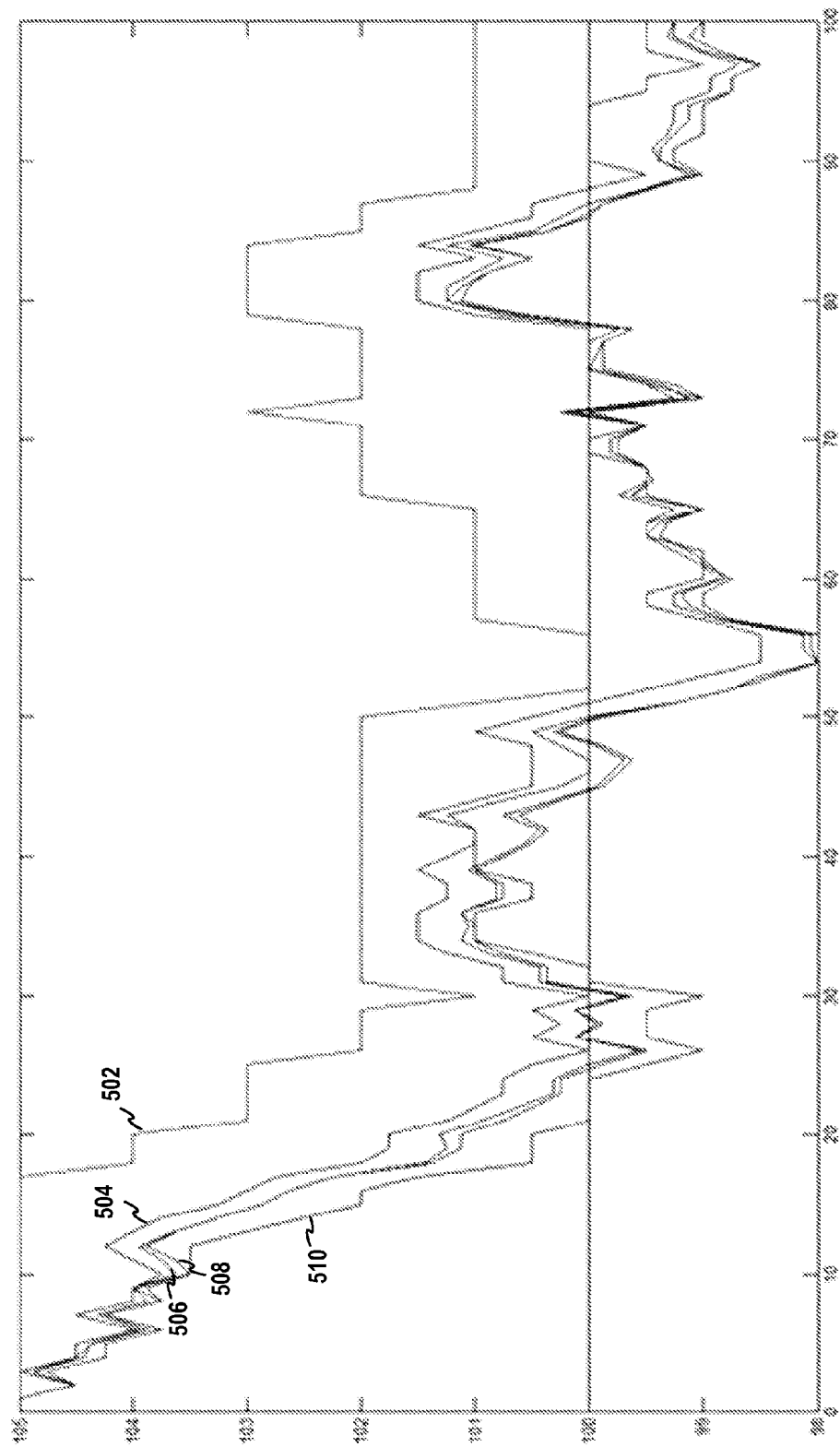
FIG. 5 illustrates a plot of experimental data showing word lengths over quantization amounts for several different levels of 8-bit arithmetic precision inputs.

FIG. 5 illustrates a plot of experimental data showing word lengths over quantization amounts for several different levels of 8-bit arithmetic precision inputs. The simulation data shown in FIG. 5 illustrates the effect of quantization in the infinite impulse response filtering for video data. The y-axis shows the word length choices from 98 to 105. The x-axis shows quantization percentage from 0 to 100. The beta for the simulation shown in FIG. 5 is 0.9375. The standard deviation for the simulation shown in FIG. 5 is 6.

Plot 502 shows effect for an eight bit representation wherein all eight bits are used to represent an integer value. Plot 504 shows a plot for a nine bit representation wherein eight bits identify an integer value and one bit represents a fraction value. Plot 506 shows a plot for a ten bit representation wherein eight bits identify an integer value and two bits represent a fraction value. Plot 508 shows a plot for an eleven bit representation wherein eight bits identify an integer value and three bits represent a fraction value. Plot 510 shows a plot for a twelve bit representation wherein eight bits identify an integer value and four bits represent a fraction value.

For a given quantization amount, the word length that may be needed to represent the video data is reduced when using a fractional representation for the video data as compared to the representation shown in plot 502 which does not include a fractional portion. Amongst the fractional representations plotted in FIG. 5 (e.g., 504, 506, 508, and 510), the plot 506 representing a three bit fractional value closely tracks the plot 508 representing a four bit fractional value. Thus, in some implementations, the three bit fractional representation may provide adequate precision for the output video data.

Figure 6:
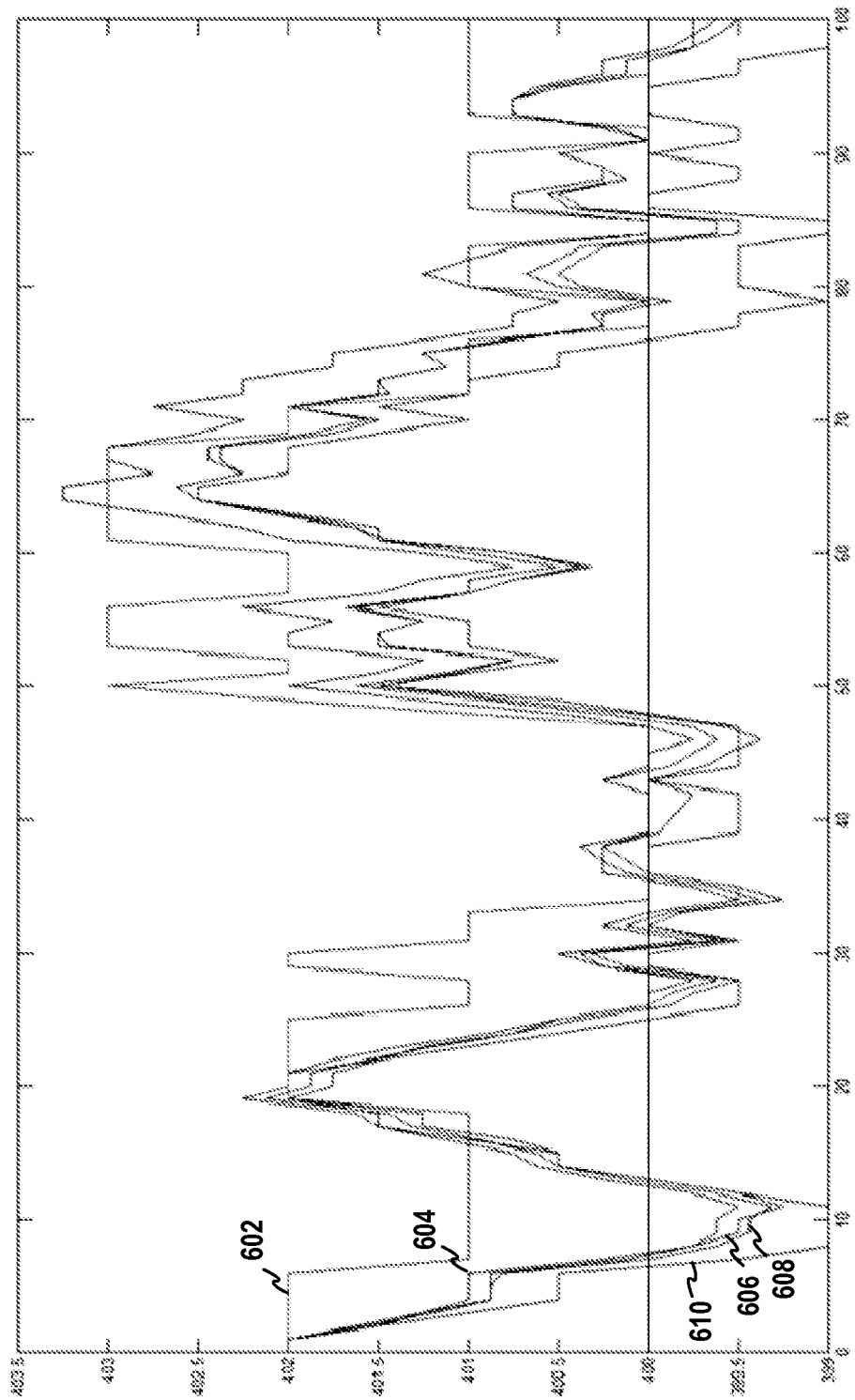
FIG. 6 illustrates a plot of experimental data showing word lengths over quantization amounts for several different levels of 10-bit arithmetic precision inputs.

FIG. 6 illustrates a plot of experimental data showing word lengths over quantization amounts for several different levels of 10-bit arithmetic precision inputs. The simulation of FIG. 6 is similar to the simulation of FIG. 5 with the main difference being the use of a ten bit integer portion with varying fractional representations. The beta for the simulation shown in FIG. 6 is 0.9375. The standard deviation for the simulation shown in FIG. 6 is 6.

Plot 602 shows effect for a ten bit representation wherein all ten bits are used to represent an integer value. Plot 604 shows a plot for an eleven bit representation wherein ten bits identify an integer value and one bit represents a fraction value. Plot 606 shows a plot for a twelve bit representation wherein ten bits identify an integer value and two bits represent a fraction value. Plot 608 shows a plot for a thirteen bit representation wherein ten bits identify an integer value and three bits represent a fraction value. Plot 610 shows a plot for a fourteen bit representation wherein ten bits identify an integer value and four bits represent a fraction value. Similar results as discussed in the eight bit example of FIG. 5 can be seen in the ten bit example of FIG. 6.

Returning to FIG. 2, the temporal noise reducer 210 may generally be implemented as an in-line operation. Accordingly, the data buffer 216 may include information for the previous portion. This is the minimal storage requirement to support the temporal noise reducer 210 described herein. The noise reduction value generated based on the input video data 202 may be used by the temporal noise reducer 210 to filter a given pixel. The generated value may be a recursion value indicating the level of recursion for temporal noise reduction.

As shown in FIG. 2, the random noise reducer 200 also includes a motion detector 700. The motion detector 700 may be configured to obtain the input video data 202. The motion detector 700 may be configured to also obtain a previously processed portion of video data from the data buffer 216. By comparing the previous portion with the corresponding portion represented in the current input video data 202, a motion estimate may be generated. The motion detector 700 may also be configured to generate the motion estimate based on a noise estimate provided by the noise estimator 800.

Figure 7:
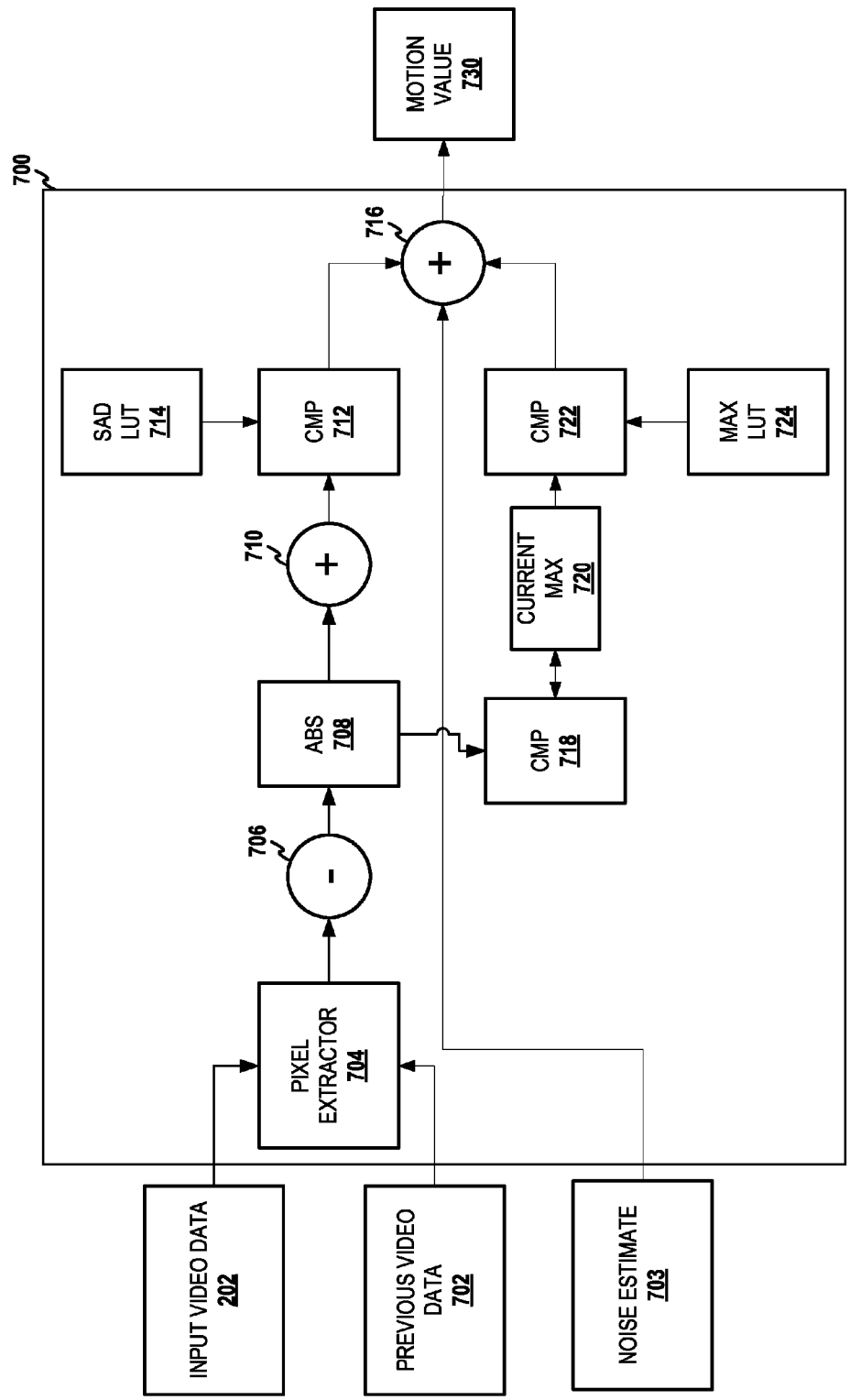
FIG. 7 illustrates a functional block diagram of an exemplary motion detector.

FIG. 7 illustrates a functional block diagram of an exemplary motion detector. The motion detector 700 receives three inputs, the input video data 202, a previous video data 702 provided by the data buffer 216, and a noise estimate 703 generated by the noise estimator 800.

The motion detector 700 may include a pixel extractor 704. The pixel extractor 704 may be configured to extract value for a pixel location in the input video data 202 and the previous video data 702. The pixel extractor 704 may provide the extracted pixel values to an adder 706 configured to determine the difference between the pixel value in the input video data 202 and the previous video data 702. The difference may be provided to an absolute value circuit 708 configured to determine the absolute value of the difference. The absolute value circuit 708 may be configured to provide the generated value to an adder 710 and to a comparator 718. The comparator 718 will be described in further detail below. The adder 710 may be configured to accumulate the absolute value of the differences for each pixel of the input video data 202. Accordingly, the extraction, difference, and absolute value determination may be performed for each pixel location in the input video data 202. Taken as a whole, the pixel extractor 704, the adder 706, the absolute value circuit 708, and the adder 710 generate a value indicating sum of absolute differences between the input video data 202 and the previous video data 702. The generated value may be represented using the number of bits used to represent the previous video data (e.g., eight integer bits and three fractional bits).

The motion detector 700 may include a comparator 712 which may be configured to obtain the value generated by adder 710. The comparator 712 may be coupled with a sum of absolute different (SAD) look up table (LUT) 714. The SAD LUT 714 may include a plurality of entries corresponding to various sums of absolute differences. The SAD LUT 714 may be stored in a memory coupled with the motion detector 700. The comparator 712 may correct the value provided by the adder 710 by selecting an entry from the SAD LUT 714 based on a comparison of the value provided by the adder 710 to the values in the SAD LUT 714. An example SAD LUT 714 is shown in Table 1 below. The SAD LUT 714 in Table 1 is a six entry look up table. However, it will be understood that more or less entries may be used to normalize the SAD value.

TABLE 1

| Input SAD Value | Normalized SAD Value |
|---|---|
| 0 | 0 |
| 10 | 1 |
| 30 | 2 |
| 65 | 3 |

TABLE 1-continued

| Input SAD Value | Normalized SAD Value |
|---|---|
| 145 | 4 |
| 212 | 5 |

Given the SAD LUT 714 as shown in Table 1, the comparator 712 would identify the row including the largest input SAD value less than or equal to the value provided by the adder 710. For example, if the value provided by the adder 710 is 54, the comparator 712 would output the value 2 would be provided. As another example, if the input SAD value is 230, the output value of 5 would be provided. The result generated by the comparator 712 may be referred to as a normalized SAD value. As shown in FIG. 7, this value is provided to an adder 716 for further processing that will be described in further detail below.

The motion detector 700 also includes a maximum motion value in generating a final motion estimation. The absolute value circuit 708 may provide the absolute value for a pixel to comparator 718. The comparator 718 may be coupled with a storage element which stores a value indicating a current maximum difference 720. The comparator 718 may compare the provided absolute difference value with the stored current maximum difference 720. If the provided absolute difference value is greater than the current maximum difference 720, the comparator 718 may store the provided absolute difference value in the storage element. Accordingly, after each pixel in the input video data 202 is processed, the value of current maximum 720 will be the largest absolute value difference for each pixel in the input video data 202.

After all pixels are processed for the input video data 202, the current maximum value 720 may be provided to a comparator 722. The comparator 722 may also receive a maximum difference (MAX) look up table (LUT) 724. As with comparator 712, comparator 722 may be configured to normalize the identified maximum difference value. The MAX LUT 724 may include a non-linear mapping from identified maximum difference values to normalized maximum difference values. The value generated by the comparator 722 may be provided to the adder 716. The MAX LUT 724 may include 16 entries.

The adder 716 may also obtain a noise estimate 703 from the noise estimator 800. The adder 716 may be configured to combine the normalized sum of absolute differences with the normalized maximum difference based on the noise estimate 703. Combination may allow the motion detector 700 to expand the spatial coverage of the estimation without adding extra line buffers to the processing. In an implementation where the motion detector 700 operates on a 5×3 window, such as that shown in FIG. 3, three line buffers are included to support the detection. In some implementations, the line buffers may be shared between the spatial noise reducer 204 and the motion detector 700. In such implementations, the shared resources may improve the power and processing resource utilization for the device. The line buffers may be implemented using one or more static RAMs.

Using the sum of absolute differences alone may miss small motions between portions of the video data which may result in over filtering. Using a maximum difference alone may be too sensitive to noise which may also result in over filtering. Thus, the motion detector 700 combines the two values. The noise estimate 703 may be used to generate thresholds for each of the sum of absolute differences and the maximum difference. When the noise estimate 703 indicates a higher amount of noise, the threshold for detecting motion may be increased accordingly to account for changes that may be due to noise rather than motion. Similarly, the threshold for detecting noise by maximum difference may be higher (e.g., more conservative estimate) than the threshold for detecting noise by sum of absolute differences.

The adder may be configured to generate the motion value using a number of bits that can be used to represent number of entries in the largest normalization table (e.g., 714, 724). For example, if SAD LUT 714 includes six entries and MAX LUT 724 includes 16 entries, the motion value 730 produced by the adder 716 may be, at most, four bits. In some implementations, a further correction comparator (not shown) may be included. The adder 716 may provide the combined motion value to the correction comparator. Using another look up table, the correction comparator may generate a non-linear mapped corrected motion value. As the motion value 730 may be provided to the spatio-temporal blender 208 and used to determine the relative strength of the spatial and temporal noise reduction, the correction comparator may be configured to generate a corrected motion value which favors spatial noise reduction in the blending. This may be desirable in some implementations as a way to reduce visual artifacts in the output video data such as ghosting.

As described, the motion detector 700 operates on two input video data, one of which as been noise reduced (e.g., previous video data 702) one of which has not (e.g., video data 202). In some implementations, the motion detector 700 may be configured receive partially processed video data from the spatial noise reducer 204, rather than input video data 202 directly from the input.

As discussed above, the motion detector 700 may receive the noise estimate 703 as an input to detection motion. The noise estimate 703 may be generated by the noise estimator 800 included in the random noise reducer 200.

Figure 8:
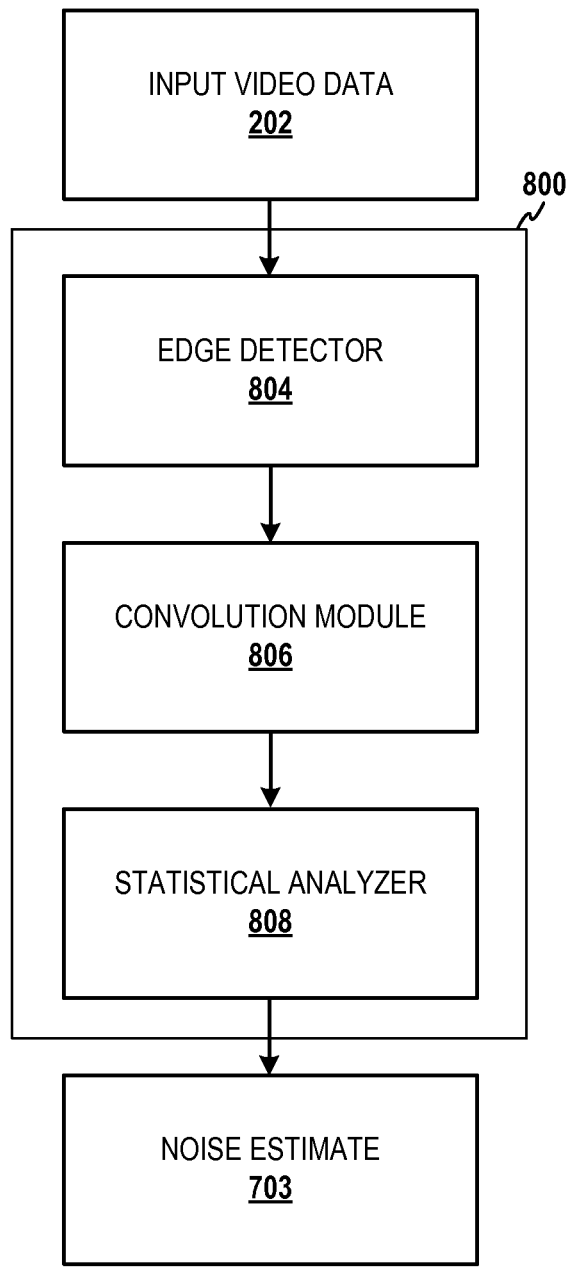
FIG. 8 illustrates a functional block diagram of an exemplary noise estimator.

FIG. 8 illustrates a functional block diagram of an exemplary noise estimator. The noise estimator 800 may obtain the input video data 202. The noise estimator 800 may provide noise estimate to various elements of the random noise reducer 200. The elements may use the noise information to determine thresholds used during the respective filtering processes. In one implementation, the noise estimator 800 may be configured to estimate noise using a 3×3 filter kernel. The images statistics for each kernel of the input video data 202 may be aggregated to produce a final estimate for the input video data 202. In some implementations, the cumulative statistics may be used to determine an edge adaptive threshold which may be applied to the image details of a subsequent portion of video data to exclude edge pixels during noise strength determination. In some implementations, the noise may be filtered across several portions of video data to allow for smooth control of the filtering of the random noise reducer 200.

The noise estimator 800 may include an edge detector 804. The edge detector 804 may be included to exclude edge regions in the video. The edge detector 804 may be omitted in some implementations. In such implementations, the noise estimator 800 may aggressively estimate noise such as for highly textured images where thin lines may be identified as noise.

The edge detector 804 may be configured to identify edges based on the luminance pixel values for a pixel of interest. In some implementation, the color channel pixel values may be used to identify the edges. The edge detector 804 may be configured to first generate a histogram for all pixels of a current portion of the video data. Equation (6) is one expression of the relationship that may be implemented in an edge detector 804 to generate a histogram G for pixel values for a pixel location I(x, y) current portion of the video data.

$$G=|G_x|+|G_y| \quad (6)$$

where
$G_x$ is a histogram generated by Equation (7) below, and
$G_y$ is a histogram generated by Equation (8) below.

$$G_x = I(x, y) * \begin{matrix} -1 & -2 & -1 \\ 0 & 0 & 0 \\ 1 & 2 & 2 \end{matrix} \quad (7)$$

where
I(x, y) are the pixel values for location (x, y) in the current portion of the video data.

$$G_y = I(x, y) * \begin{matrix} -1 & 0 & 1 \\ -2 & 0 & 2 \\ -1 & 0 & 1 \end{matrix} \quad (8)$$

where
I(x, y) are the pixel values for location (x, y) in the current portion of the video data.

The edge detector 804 may be configured to generate a cumulative density function (CDF) from the generated histogram. Once a CDF is obtained for the filter kernel for the current portion of the video data, a second histogram $G_{th}$ is generated based on the CDF and a threshold quantity of pixels included in an edge. Equation (9) is one expression of the relationship that may be implemented in an edge detector 804 to generate the second histogram $G_{th}$.

Solve for $G_{th}$, such that $$CDF(G_{th}) >= p \quad (9)$$

where
p is a threshold edge detection pixel count.

The threshold edge detection pixel count is a value indicating the quantity of pixels to be considered an edge. For example, the threshold edge detection pixel count may represent a percentage of pixels in the portion of video data (e.g., 10%) or a count of pixels in the portion of video data (e.g., 35). In some implementations, the threshold edge detection pixel count may be user specified. In some implementations, the threshold edge detection pixel count may be determined based on the video data or values stored in memory coupled with the noise estimator 800.

Using the second histogram, the edge detector 804 may be configured to generate a thresholded edge map for another portion of the video data. The thresholded edge map provides an indication of edges within the other portion of video data. The thresholded edge map may be provided to a convolution module 806.

The convolution module 806 may be configured to convolve each pixel in a portion of video data which was identified as a non-edge pixel. In some implementations, the convolution may be a Laplacian convolution. For example, the current pixel value may be convolved with the difference of two Laplacians (L). Equation (10) illustrates an example Laplacian (L).

$$L = \begin{bmatrix} 1 & -2 & 1 \\ -2 & 4 & -2 \\ 1 & -2 & 1 \end{bmatrix} \quad (10)$$

The convolution module 806 may also be configured to maintain a count of pixels identified as non-edges ($p_{count}$). The convolved pixel value and pixel count may be provided to a statistical analyzer 808.

The statistical analyzer 808 may be configured to generate the noise estimate 703 based on the values provided. One example statistic that may be generated is an average (avg) for the current portion of video data. The average for the current portion may be generated based on a sum of the absolute values for the convolved pixel values for all pixels in the current portion of video data.

The noise estimate 703 ($\sigma$) may be generated using an expression similar to that shown in Equation (11).

$$\sigma = \sqrt{\pi/2} \, \frac{avg}{6 p_{count}} \quad (11)$$

where
avg is the average convolved value for the current portion, and
$p_{count}$ is the number of non-edge pixels identified in the current portion.

Note, Equation (11) assumes the current portion of video data include six pixels. Other portion sizes are contemplated and may be processed in accordance with the techniques described herein. For example, a 4×4 filter kernel may be processed which would include sixteen pixels. Accordingly, in such implementations, the denominator would include sixteen rather than six.

In some implementations, the statistical analyzer 808 may also be configured to generate a moving average filter. The moving average filter may be included to provide a stable value of noise strength. In such implementations, a filter window size between six and eight pixels may be used to provide the moving average noise estimate.

By providing the noise estimate 703 to the spatial noise reducer, the strength and thresholds used in performing spatial noise reduction may be based on the noise estimate. This may provide a more dynamic spatial noise reduction which considers the specific image data rather than static preconfigured values. The strength of the noise reduction along with the thresholds used to perform the noise reduction may be dynamically determined.

Similarly, in providing the noise estimate 703 to the temporal noise reducer, the strength of the temporal noise reduction may be adjusted based on the overall "noisiness" of the image. Further, in providing the noise estimate 703 to the motion detector, the thresholds for motion detection may be dynamically determined such that for more noisy content, a more conservative motion detection threshold is determined and included in the motion detection process.

Returning to FIG. 2, the spatio-temporal blender 208 may be configured to blend the results of the spatial noise reduction and the temporal noise reduction to generate an output video data 214. The spatio-temporal blender 208 may also generate the output based on the motion estimation value 703 provided by the motion detector 700. Equation (12) is one expression of the relationship that may be implemented in a spatio-temporal blender 208 to generate a blended filtered pixel value Y(i, j, n).

$$Y(i,j,n) = Y_s(i,j,n) Y_m(i,j,n) + Y_t(i,j,n)(1 - Y_m(i,j,n)) \quad (12)$$

where $Y_t(i, j, n)$ is the temporally filtered pixel value at a location $(i, j)$ for the current portion $(n)$ of the video data, $Y_s(i, j, n)$ is the spatially filtered pixel value at a location $(i, j)$ for the current portion $(n)$ of the video data, and $Y_m(i, j, n)$ is the motion value from the motion detector at a location $(i, j)$ for the current portion $(n)$ of the video data.

As discussed above, the precision of the temporally filtered pixel value may be represented using integer and fractional portions. As with the temporal noise reducer 210, the precision of the blended noise reduced pixel value is dependent upon the inputs to the spatio-temporal blender 208. Generally, the precision of output of the spatio-temporal blender 208 may be of the same precision as the most precise input. For instance, in the above example, the temporally filtered pixel value is represented using eleven bits (e.g., eight integer bits and three fractional bits). Accordingly, the output of the spatio-temporal blender 208 may be of the same precision as the most precise input.

The output of the spatio-temporal blender 208 may be provided to the data buffer 216. As described above, the data buffer 216 may store the random noise reduced pixel values for a first portion of the video data to be used for processing another portion of video data. For example, motion estimation may compare a current portion of the video data with another portion from the data buffer 216.

The inputs and outputs for each element shown in FIG. 2 are summarized in Table 2 below. The number of bits for each input/output is shown in brackets. The notation for identifying the number of bits indicates the number of integer bits and the number of fractional bits. For example, a value of "8.2" indicates eight integer bits and two fractional bits for a total of ten bits. A larger number of bits may be used for temporal noise reduction to prevent rounding effects and premature saturation of the output.

TABLE 2

| Element | Input(s) [bits] | Output(s) [bits] |
|---|---|---|
| Spatial Noise Reducer 204 | Input video data 202 [8.0] Noise Estimation [5.2] | Spatially filtered video Data [8.0] |
| Temporal Noise Reducer 210 | Input video data 202 [8.0] Buffered video data [8.3] Noise estimation [5.2] | Temporally filtered video data [8.3] |
| Spatio-temporal Blender 208 | Temporally filtered video data [8.3] Spatially filtered video data [8.3] Motion value [4.0] | Blended filtered video data [8.3] |
| Data Buffer 216 | Blended filtered video data [8.3] | Blended filtered video data [8.3] |

Figure 9:
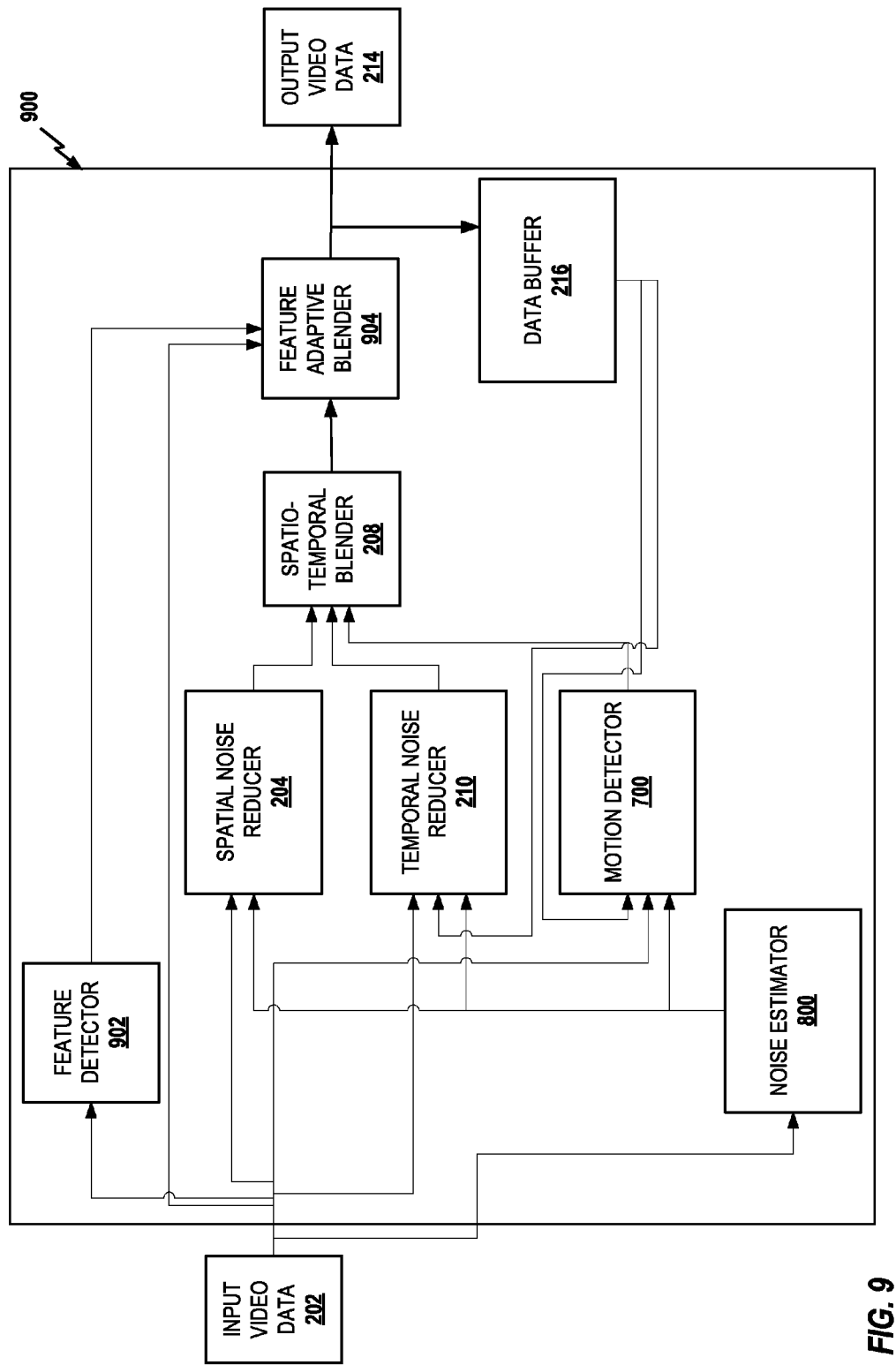
FIG. 9 illustrates a functional block diagram of an exemplary feature adaptive random noise reducer.

FIG. 9 illustrates a functional block diagram of an exemplary feature adaptive random noise reducer. The feature adaptive random noise reducer 900 is similar to the random noise reducer shown in FIG. 2. The feature adaptive random noise reducer 900 also includes a feature detector 902. The feature detector 902 is configured to detect a feature of the image and provide additional blending information to a feature adaptive blender 904. For example, skin color may be a feature for which specific noise reduction blending may be applied. The specific noise reduction blending may be predetermined or based on a characteristic (e.g., quantity, quality) of the feature detected. The feature detector 902 receives the input video data 202. The feature detector 902 provides an output value to the feature adaptive blender 904. The output value may indicate the feature has been detected. The output value may indicate one or more characteristic of the feature detected.

While only one feature detector 902 is shown in FIG. 9, it will be understood that multiple feature detectors may be include to detect various features. In some implementations, the feature detector 902 may be configured to detect multiple features. For example, a list of features for detection may be stored in a memory coupled to the feature adaptive random noise reducer 900. The detection may include, for example, a pixel value and/or range of values (e.g., chroma or luma values). As another example, the detection may include pixel value differences (e.g., spatial or temporal). Furthermore, the feature detector 902 may be enabled or disabled based on the input video data or a configuration value (e.g., user preference).

The feature adaptive blender 904 obtains the output signal from the feature detector 902. The feature adaptive blender 904 also obtained video data generated by the spatio-temporal blender 208. In some implementations, the feature adaptive blender 904 may be implemented as part of the spatio-temporal blender 208. In such implementations, the spatio-temporal blender 208 obtains the output from the feature detector 902.

Based on the input video data 902, the spatio-temporal blended video data, and the feature detection, the feature adaptive blender generates the output video data 214. For example, by comparing the input video data 202 with the spatio-temporal blended video data, the feature adaptive blender may be configured to filter portions of the spatio-temporal blended video data identified as having the determined feature. In the skin tone example, the filtering may adjust the hue of pixel values identified as skin to provide a more "realistic" look to the output video data 214. The output video data 214 is provided as described above in FIG. 2.

Figure 10:
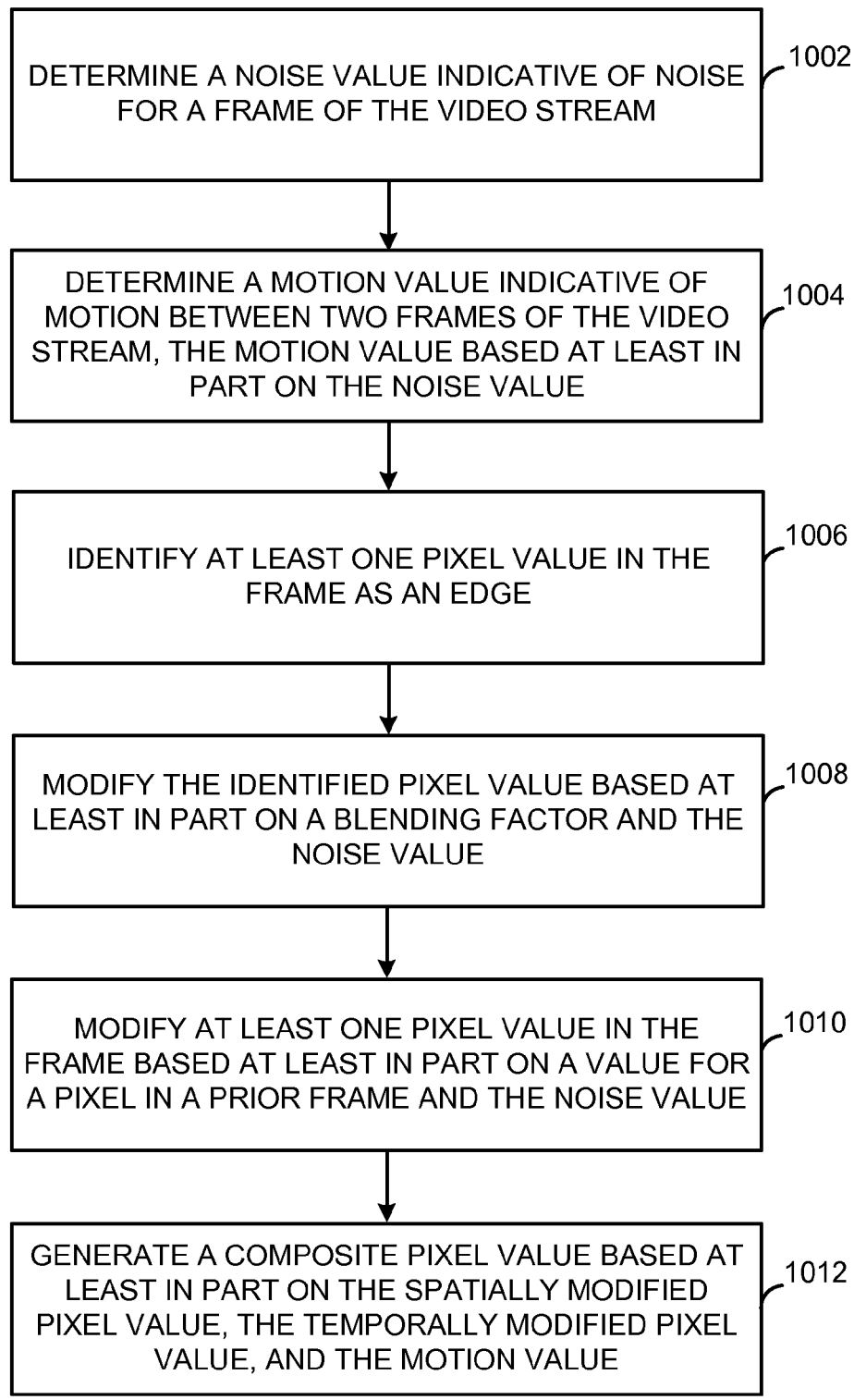
FIG. 10 illustrates a process flow diagram for reducing noise of a video stream.

FIG. 10 illustrates a process flow diagram for a method of reducing noise of a video stream. The process shown in FIG. 10 may be implemented in whole or in part by one or more of the devices described herein, such as that shown in FIG. 2. At node 1002 a noise value indicative of noise for a frame of the video stream is determined. At node 1004, a motion value indicative of motion between two frames of the video stream, the motion value based at least in part on the noise value is determined. At node 1006, at least one pixel value in the frame as an edge is identified. At node 1008, the identified pixel value is modified based at least in part on a blending factor and the noise value. At node 1010, at least one pixel value in the frame is modified based at least in part on a value for a pixel in a prior frame and the noise value. At node 1012, a composite pixel value is generated based at least in part on the spatially modified pixel value, the temporally modified pixel value, and the motion value.

Figure 11:
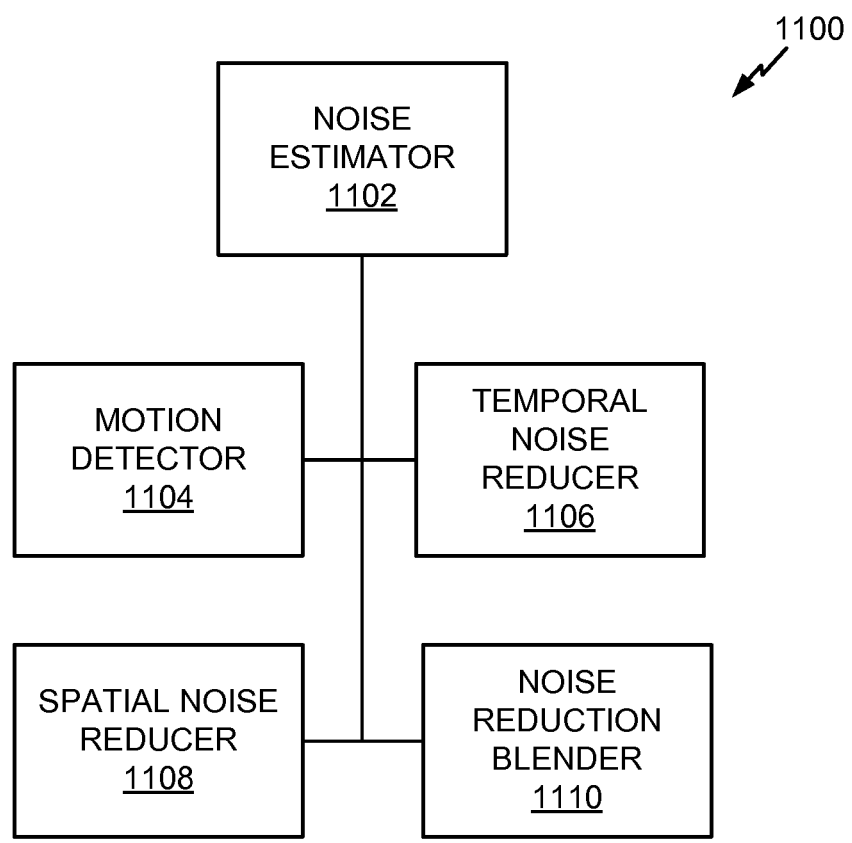
FIG. 11 illustrates a functional block diagram for another exemplary random noise reducer.

FIG. 11 illustrates a functional block diagram for another exemplary random noise reducer. Those skilled in the art will appreciate that a random noise reducer may have more components than the simplified random noise reducer 1100 illustrated in FIG. 11. The random noise reducer 1100 shown in FIG. 11 includes only those components useful for describing some prominent features of implementations with the scope of the claims. The random noise reducer 1100 includes a noise estimator 1102, a motion detector 1104, a spatial noise reducer 1106, a temporal noise reducer 1108, and a noise reduction blender 1110.

The noise estimator 1102 is configured to determine a noise value indicative of noise for a frame of the video stream. The noise estimator 1102 may include one or more of a comparator, a receiver, an edge detector, a convolution module, a statistical analyzer, a memory, a processor, and an arithmetic unit. In some implementations, the means for determining a noise value includes the noise estimator 1102.

The motion detector 1104 is configured to determine a motion value indicative of motion between two frames of the video stream, the motion value based at least in part on the noise value. The motion detector 1104 may include one or more of a memory, a processor, a look up table, a line buffer, and an arithmetic unit. In some implementations, the means for determining a motion value include the motion detector 1104.

The spatial noise reducer 1106 is configured to identify at least one pixel value in the frame as an edge and for modifying the identified pixel value based at least in part on a blending factor and the noise value. The spatial noise reducer 1106 may include one or more of an edge adaptive low pass filter, a feature adaptive filter, a memory, a comparator, and a processor. In some implementations, the means for identifying at least one pixel value and for modifying the identified pixel value may include the spatial noise reducer 1106.

The temporal noise reducer 1108 is configured to means for modifying at least one pixel value in the frame based at least in part on a value for a pixel in a prior frame and the noise value. The temporal noise reducer 1108 may include one or more of a temporal filter, an infinite impulse response filter, a processor, a memory, a buffer, and an arithmetic unit. In some implementations, the means for modifying at least one pixel value in the frame based at least in part on a value for a pixel in a prior frame and the noise value may include the temporal noise reducer 1108.

The noise reduction blender 1110 is configured to means for generating a composite pixel value based at least in part on the spatially modified pixel value, the temporally modified pixel value, and the motion value. The noise reduction blender 1110 may include one or more of a processor, a memory, a buffer, an image feature detector, and an arithmetic unit. In some implementations, the means for generating a composite pixel value include the noise reduction blender 1110.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an encoding device and/or decoding device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A device for reducing noise of a digital video stream comprising:
   a noise estimator configured to determine a noise value indicative of noise for a frame of a video stream;
   a motion detector configured to generate a motion value indicative of motion between two frames of the video stream, wherein the motion detector generates the motion value using the noise value;
   a spatial noise reducer configured to identify at least one pixel value in the frame as an edge and modify the identified pixel value based at least in part on a blending factor and the noise value;
   a temporal noise reducer configured to modify at least one pixel value in the frame based at least in part on a value for a pixel in a prior frame and the noise value; and
   a blender configured to generate a composite pixel value based at least in part on the spatially modified pixel value, the temporally modified pixel value, and the motion value,
   wherein the pixel value generated by the temporal noise reducer includes a number of bits which is larger than a number of bits for the pixel before temporal noise reduction.

2. The device of claim 1, wherein determining the noise value comprises:
   identifying edge pixels included in a portion of the frame of the video stream based on pixel values for each pixel in the portion of the video frame;
   convoluting pixels included in the portion of the frame of video identified as non-edge pixels; and
   generating the noise value based on the convolved pixel values.

3. The device of claim 2, wherein convoluting pixels comprises Laplacian convolution.

4. The device of claim 2, wherein generating the noise value is based on an average convolved value for the current portion and a number of non-edge pixels identified in the portion of the frame.

5. The device of claim 1, wherein determining the motion value comprises:
   generating a sum of absolute differences between two frames of the video stream, the two frames comprising a current frame of the video stream and the prior frame of the video stream;
   generating a maximum sum of absolute differences for the video stream; and
   determining the motion value for the current frame based on the sum of absolute differences between the two frames and the maximum sum of absolute differences for the video stream.

6. The device of claim 5, wherein determining the current frame of the video stream is not yet noise reduced and the prior frame of the video stream is noise reduced.

7. The device of claim 1, wherein the generated pixel value includes eleven bits, wherein eight of the eleven bits indicate an integer portion of the pixel value and three of the eleven bits indicate a fractional portion of the pixel value.

8. The device of claim 1, further comprising:
   a feature detector configured to identify a feature included in the video stream;
   a feature blender configured to generate another composite pixel value based at least in part on the identified feature and the composite pixel value.

9. The device of claim 8, wherein the feature includes skin tone pixels.

10. A method for reducing noise of a digital video stream comprising:
    determining a noise value indicative of noise for a frame of a video stream;
    generating, using the noise value, a motion value indicative of motion between two frames of the video stream;
    identifying at least one pixel value in the frame as an edge;
    modifying the identified pixel value based at least in part on a blending factor and the noise value to generate a spatially modified pixel value;
    modifying at least one pixel value in the frame based at least in part on a value for a pixel in a prior frame and the noise value to generate a temporally modified pixel value, wherein the temporally modified pixel value includes a number of bits which is larger than a number of bits for the pixel before modification; and
    generating a composite pixel value based at least in part on the spatially modified pixel value, the temporally modified pixel value, and the motion value.

11. The method of claim 10, wherein determining the noise value comprises:

identifying edge pixels included in a portion of the frame of the video stream data based on pixel values for each pixel in the portion of the video frame;

convoluting pixels included in the portion of the frame of video identified as non-edge pixels; and generating the noise value based on the convolved pixel values.

12. The method of claim 11, wherein convoluting pixels comprises Laplacian convolution.

13. The method of claim 11, wherein generating the noise value is based on an average convolved value for the current portion and a number of non-edge pixels identified in the portion of the frame.

14. The method of claim 10, wherein determining the motion value comprises:

generating a sum of absolute differences between two frames of the video stream, the two frames comprising a current frame of the video stream and the prior frame of the video stream;

generating a maximum sum of absolute differences for the video stream; and determining the motion value for the current frame based on the sum of absolute differences between the two frames and the maximum sum of absolute differences for the video stream.

15. The method of claim 14, wherein determining the current frame of the video stream is not yet noise reduced and the prior frame of the video stream is noise reduced.

16. The method of claim 10, wherein the temporally modified pixel value includes eleven bits, wherein eight of the eleven bits indicate an integer portion of the temporally modified pixel value and three of the eleven bits indicate a fractional portion of the temporally modified pixel value.

17. The method of claim 10, further comprising:

identifying a feature included in the video stream;

generating another composite pixel value based at least in part on the identified feature and the composite pixel value.

18. The method of claim 17, wherein the feature includes skin tone pixels.

19. A device for reducing noise of a digital video stream comprising:

means for determining a noise value indicative of noise for a frame of a video stream;

means for generating, using the noise value, a motion value indicative of motion between two frames of the video stream;

means for identifying at least one pixel value in the frame as an edge and for modifying the identified pixel value based at least in part on a blending factor and the noise value to generate a spatially modified pixel value;

means for modifying at least one pixel value in the frame based at least in part on a value for a pixel in a prior frame and the noise value to generate a temporally modified pixel value, wherein the temporally modified pixel value includes a number of bits which is larger than a number of bits for the pixel before modification; and means for generating a composite pixel value based at least in part on the spatially modified pixel value, the temporally modified pixel value, and the motion value.

20. A non-transitory computer-readable storage medium comprising instructions executable by a processor of an apparatus for reducing noise in a digital video stream, the instructions causing the apparatus to:

determine a noise value indicative of noise for a frame of a video stream;

generate, using the noise value, a motion value indicative of motion between two frames of the video stream;

identify at least one pixel value in the frame as an edge and modify the identified pixel value based at least in part on a blending factor and the noise value to generate a spatially modified pixel value;

modify at least one pixel value in the frame based at least in part on a value for a pixel in a prior frame and the noise value to generate a temporally modified pixel value, wherein the temporally modified pixel value includes a number of bits which is larger than a number of bits for the pixel before modification; and generate a composite pixel value based at least in part on the spatially modified pixel value, the temporally modified pixel value, and the motion value.

21. A device for reducing noise of a digital video stream comprising:

a processor configured to:

determine a noise value indicative of noise for a frame of a video stream;

generate, using the noise value, a motion value indicative of motion between two frames of the video stream;

identify at least one pixel value in the frame as an edge and modify the identified pixel value based at least in part on a blending factor and the noise value to generate a spatially modified pixel value;

modify at least one pixel value in the frame based at least in part on a value for a pixel in a prior frame and the noise value to generate a temporally modified pixel value, wherein the temporally modified pixel value includes a number of bits which is larger than a number of bits for the pixel before modification; and generate a composite pixel value based at least in part on the spatially modified pixel value, the temporally modified pixel value, and the motion value.

\* \* \* \* \*